(12) United States Patent
Busse et al.

(10) Patent No.: US 8,869,761 B2
(45) Date of Patent: Oct. 28, 2014

(54) CAMSHAFT ADJUSTER AND U-SHAPED SEALING ELEMENT FOR SEALING A RADIAL FACE OF A VANE OF A CAMSHAFT ADJUSTER

(75) Inventors: Michael Busse, Herzogenaurach (DE); Stefan Schelter, Wilhelmsdorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 198 days.

(21) Appl. No.: 13/640,132

(22) PCT Filed: Apr. 13, 2011

(86) PCT No.: PCT/EP2011/055755
§ 371 (c)(1),
(2), (4) Date: Oct. 9, 2012

(87) PCT Pub. No.: WO2011/138136
PCT Pub. Date: Nov. 10, 2011

(65) Prior Publication Data
US 2013/0025553 A1    Jan. 31, 2013

(30) Foreign Application Priority Data
May 6, 2010    (DE) .......................... 10 2010 019 530

(51) Int. Cl.
*F01L 1/34*    (2006.01)
*F15B 15/12*    (2006.01)
*F01L 1/344*    (2006.01)
*F16J 15/54*    (2006.01)

(52) U.S. Cl.
CPC .............. *F01L 1/3442* (2013.01); *F15B 15/12* (2013.01); *F01L 2001/34479* (2013.01); *F16J 15/545* (2013.01)
USPC .................................... 123/90.17; 123/90.31

(58) Field of Classification Search
USPC ......... 123/90.15, 90.17, 90.31; 277/530, 395, 277/514, 408
See application file for complete search history.

(56) References Cited

U.S. PATENT DOCUMENTS

| 2,339,042 A | 1/1944 | Anderson |
| 4,817,504 A | 4/1989 | Lieberman |

(Continued)

FOREIGN PATENT DOCUMENTS

| DE | 102004005822 | 8/2005 |
| DE | 102006004718 | 8/2007 |

(Continued)

*Primary Examiner* — Thomas Denion
*Assistant Examiner* — Steven D Shipe
(74) *Attorney, Agent, or Firm* — Volpe and Koenig, P.C.

(57) ABSTRACT

A camshaft adjuster (2) having a vane-type design with a stator (4) and a rotor (6), which can be rotated relative to the stator (4), and at least two pressure chambers (8a, 8b) formed between the stator (4) and the rotor (6). The pressure chambers (8a, 8b) are separated from each other by a radially oriented vane (12) of the rotor (6), wherein the pressure chambers (8a, 8b) can be alternately supplied with a pressure medium. The vane (12) has a radial face (20) and two lateral faces (20) that are directed toward the pressure chambers (8a, 8b). The radial face (20) is sealed by a U-shaped sealing element (26) having a main limb (30) and two side limbs (32) seated against the lateral faces (22). The pressure chambers (8a, 8b) of the camshaft adjuster (2) are sealed particularly reliably by designing check valves (28) on the side limbs (32) of the sealing element (26) and by designing, on the lateral faces (22) of the vane (12), outlets for the pressure medium with which the check valves (28) are associated.

9 Claims, 2 Drawing Sheets

(56) References Cited

U.S. PATENT DOCUMENTS

| | | | |
|---|---|---|---|
| 5,813,316 A | 9/1998 | Sekiya et al. | |
| 6,032,626 A * | 3/2000 | Haag | 123/90.17 |
| 6,412,462 B1 * | 7/2002 | Lichti et al. | 123/90.17 |
| 2013/0199471 A1 * | 8/2013 | Schafer et al. | 123/90.15 |
| 2013/0199477 A1 * | 8/2013 | Schafer et al. | 123/90.17 |

FOREIGN PATENT DOCUMENTS

| | | |
|---|---|---|
| DE | 10237414 | 9/2012 |
| EP | 0735279 | 10/1996 |
| GB | 2415480 | 12/2005 |
| WO | 2005113945 | 12/2005 |

\* cited by examiner

CAMSHAFT ADJUSTER AND U-SHAPED SEALING ELEMENT FOR SEALING A RADIAL FACE OF A VANE OF A CAMSHAFT ADJUSTER

FIELD OF THE INVENTION

The invention relates to a vane-type camshaft adjuster having a stator and having a rotor which is rotatable relative to the stator and having at least two pressure chambers which are formed between the stator and the rotor and which are separated from one another by a radially oriented vane of the rotor, wherein a pressure medium can be supplied alternately to the pressure chambers, wherein the vane has a radial surface and two side surfaces directed toward the pressure chambers, and wherein the radial surface is sealed off by a U-shaped sealing element having a base limb and having two side limbs which bear against the side surfaces. A camshaft adjuster of this type is described in DE 20 2006 004 718 A1. The invention also relates to a U-shaped sealing element for sealing off a radial surface of a vane of a camshaft adjuster.

BACKGROUND

In modern internal combustion engines, devices for variably adjusting the timing of gas exchange valves, also referred to as camshaft adjusters, are used in order to be able to vary the phase position of a camshaft relative to a crankshaft in a defined angle range between a maximum advanced position and a maximum retarded position. The cams of the camshaft normally bear against cam followers, for example bucket tappets, rocker arms or oscillating arms. When a camshaft is set in rotation, the cams roll on the cam followers, which in turn actuate the gas exchange valves. Both the opening duration and also the amplitude, and also the opening and closing times of the gas exchange valves, are thus defined by the position and the shape of the cams.

The angular displacement of the camshaft in relation to the crankshaft in order to obtain optimum timing for different engine speed and load states is referred to as camshaft adjustment. One design variant of a camshaft adjuster operates for example on the basis of the so-called oscillating motor principle. Here, a stator and a rotor are provided which are arranged coaxially and which are movable relative to one another. The stator and the rotor together form a hydraulic chamber pair. Here, a chamber pair is delimited in each case by webs of the stator and is divided by a respective vane of the rotor into two oppositely-acting pressure chambers, the volumes of which are varied in opposition to one another by means of a relative rotational movement of the rotor with respect to the stator. In the position of maximum adjustment, the respective vane bears against one of the edge-side webs of the stator. The relative rotational movement of the rotor is realized by means of an adjustment of the vane by virtue of a hydraulic medium or pressure medium, such as for example oil, being introduced via pressure medium ducts into one of the pressure chambers of the chamber pairs and pushing the vane away. The pressure medium ducts open out on both sides of the respective vane, such that the hydraulic medium is conducted into the respective pressure chamber. With the adjustment of the rotor, the camshaft which is fastened to the rotor is adjusted for example in the advanced direction, that is to say of an earlier opening time of the gas exchange valves. With an adjustment of the rotor in the opposite direction, the camshaft is adjusted relative to the crankshaft in the retarded direction, that is to say toward a later opening time of the gas exchange valves.

An undesired exchange of oil between the pressure chambers of a chamber pair may take place in the region of contact between the vane of the rotor and an inner lateral surface of the stator, because the sealing length of the vane in the circumferential direction is relatively small. To prevent leakage at this location, the camshaft adjuster from DE 10 2006 004 718 A1 comprises a U-shaped sealing element comprised of a spring steel or a resiliently elastic plastic. The sealing element has a base limb, which is oriented substantially in the circumferential direction, and two radially oriented side limbs, which engage over the vane. An outer side of the base limb is of substantially concave form, such that the base limb has two maxima in the region of the side limbs and has an approximately central minimum. The base limb bears against the lateral surface of the stator in the region of its maxima. In the region of the minimum, the sealing element bears against a radial surface of the vane.

For failure-free operation of the camshaft adjuster, it is furthermore highly important not only to minimize leakage between the oppositely acting pressure chambers but rather also to prevent the oil from flowing out of the pressure chambers and back into the pressure medium ducts.

SUMMARY

The invention is based on the object of permitting reliable sealing of the pressure chambers of a camshaft adjuster.

The object is achieved according to the invention by means of a vane-type camshaft adjuster having a stator and having a rotor which is rotatable relative to the stator and having at least two pressure chambers which are formed between the stator and the rotor, and which will hereinafter be referred to simply as chambers. The chambers are separated from one another by a radially oriented vane of the rotor, wherein a pressure medium can be supplied alternately to the pressure chambers during operation. The vane has a radial surface and two side surfaces directed toward the pressure chambers. The radial surface is sealed off by a U-shaped sealing element having a base limb and having two side limbs which bear against the side surfaces. Check valves are formed on the side limbs, and outlets for the pressure medium are formed on the side surfaces of the vane, to which outlets the check valves are assigned.

The object is furthermore achieved according to the invention by means of a U-shaped sealing element for sealing off a radial surface of a vane of a camshaft adjuster, comprising a base limb and two side limbs, wherein on the side limbs there are provided check valves for outlets, which are formed in the vane, for a pressure medium. The advantages and preferred embodiments discussed below with regard to the camshaft adjuster can be transferred analogously to the sealing element.

The invention is based on the realization that particularly reliable sealing of the chambers of a camshaft adjuster is ensured by virtue of the function of the sealing element, which serves firstly to provide radial sealing between the oppositely acting chambers of a chamber pair, being enhanced to include sealing of the respective chambers with respect to the pressure medium ducts for the pressure medium supply. The only design prerequisite for this is that the pressure medium ducts open into the chambers in the region of the side surfaces of the vane of the rotor, such that the U-shaped sealing element which engages over the vane can, by means of its side limbs, cover the outlets of the pressure medium ducts. Here, a volume accumulator for the pressure medium is in particular formed in the rotor, such that as a result of said arrangement of the volume accumulator, the pressure buildup during the adjustment of the camshaft adjuster is maintained. The oil is introduced from said volume accumulator into the interior of the vane via the pressure medium ducts, and is subsequently fed via an outlet on the corresponding side surface of the vane into one of the chambers when negative pressure in relation to the volume accumulator prevails in the chamber.

A check valve is to be understood to mean a valve element which opens in a certain flow direction and closes in the opposite flow direction. Here, the check valve opens when the pressure medium is conducted into the corresponding chamber, and closes in order to prevent the pressure medium from escaping back into the volume accumulator. The check valves are dimensioned and positioned such that, in the assembled state of the camshaft adjuster, they are situated in front of the outlets on the vanes.

The check valves which are arranged on the side limbs of the sealing element correspondingly to the outlets are situated outside the vane. The manufacture of the check valves is thus decoupled from the manufacture of the rotor and of the stator, and the assembly of said check valves is significantly simpler in relation to an arrangement of the check valves within the pressure medium ducts.

The significant advantage of said embodiment is that the sealing of the respective chamber with respect to the oppositely acting chamber and with respect to the volume accumulator is realized by means of a single sealing element which requires a small amount of installation space. The check valves are in particular an integral constituent part of the sealing element and are formed in the same manufacturing step as the sealing element. A further production step for the separate assembly of the check valves is thus eliminated. Because the sealing element and the check valves need not be individually assembled, the manufacture of the camshaft adjuster is characterized by low costs.

For a simple design of the sealing element, the latter is comprised of a sheet-metal part, wherein the check valves are punched out in the side limbs. The sealing element is in particular manufactured from an endless profile by cutting and severing to a certain length. The check valves are subsequently punched out in the material of the sealing element. This permits particularly inexpensive manufacture. The sealing element may alternatively be produced from an elastic plastic, which likewise permits simple and inexpensive production of the check valves.

In a preferred embodiment, the check valve comprises a bending beam and a circular plate. Here, the circular plate constitutes the closing element of the check valve, which is connected to the sealing element by the bending beam. Due to a pressure difference between the volume accumulator and the corresponding chamber, the circular plate is pushed outward toward the chamber by the oil, such that the outlet is exposed and the oil can flow into the chamber. Here, the circular plate performs a pivoting movement about a pivot axis which coincides with the connecting line of the beam to the sealing element. The circular plate is in particular formed so as to be slightly larger than the corresponding outlet on the vane.

In a further preferred embodiment, for the resetting of the circular plate, a stroke limiter in the form of a spring element is provided, which stroke limiter is in the form of a bent-over lug and presses against the circular plate. In order that the oil can be introduced into the chamber, said oil must overcome the force stored in the beam, and the circular plate reaches the stroke limiter when the check valve is open to a maximum extent. In the unprocessed state, the stroke limiter constitutes a lug which projects from the edge of the sealing element, which lug is subsequently bent over through approximately 180° and in particular flanged so as to bear against the outer side of the side limb and, in so doing, push the circular plate of the check valve inward. So as to restrict only the movement of the circular plate but not the movement of the beam, the lug is in particular arranged on the edge of the sealing element such that the plate is situated between said lug and the pivot axis. Due to the stroke limiter, the circular plate exhibits elastic behavior and assumes its starting or closed position when the same pressure prevails on both sides of the check valve or when the pressure in the chamber is higher than that in the pressure medium duct.

The base limb of the sealing element is preferably of convex form as viewed from the outside. When the base limb is preloaded with respect to the stator, the base limb thus bears areally against the inner lateral surface of the stator and ensures a good sealing action in said region. Here, the curvature of the base limb is in particular small; the radius of curvature is for example several times greater than the length of the arc of the base limb.

On the base limb of the sealing element, there is preferably provided a leaf spring for supporting the sealing element on the radial surface of the vane. As a result of the leaf spring, therefore, the sealing element bears permanently under preload against the stator. The leaf spring may be of either single-part or multi-part form. The leaf spring is in particular of two-part form, wherein both leaves are pushed radially inward toward the vane. The leaf spring is in particular formed into the material of the sealing element, for example by cutting or punching. For the support of the leaf spring, a groove is preferably formed on the radial surface of the vane.

The larger the surface over which the oil can exert radial pressure forces on the sealing element, the greater the probability of the oil pushing the base limb radially inward and penetrating deeper into the gap between the sealing element and the lateral surface of the stator, until, in the worst case, a short circuit is produced between the two chambers. To prevent this, the edge regions between the base limb and the side limbs are preferably of sharp-edged form. This means that the rounded edges between the base limb and the side limbs have a very small radius of curvature, in particular a radius of curvature which is several times smaller than the radial lengths of the side limbs.

In a preferred variant, the vane is braced between the elastically flared side limbs of the sealing element. The side surfaces of the vane run in particular parallel to one another, and the side limbs of the sealing element which is mounted on the vane are likewise oriented parallel to one another. The sealing element is however formed such that, in the pre-assembly state, the side limbs run so as to converge on one another proceeding from the base limb. Only during the assembly of the sealing element are the side limbs flared so as to assume the parallel orientation. Therefore, in the assembled state, there is a small amount of friction between the vane and the side limbs, which friction prevents oil from being able to penetrate between the side limbs and the vane.

An abutment of the rotor against the stator by means of the vane is no longer possible due to the sealing element, because the stroke limiter can be deformed in this way. For this reason, there is preferably formed on the outer diameter of the rotor at least one lug for abutment against the stator. The lug projects radially outward from the rotor, wherein the height of said lug is smaller and in particular many times smaller than that of the vane. The height of the lug amounts to for example approximately ¼ to ⅓ the height of the vane. In the stator, there is provided in particular a receptacle in the circumferential direction, which receptacle is correlated with the height of the lug and thus forms the stop for the rotor. As an alternative to a lug on the outer diameter of the rotor, the stop may be realized by means of an axial pin which projects axially from the rotor and engages into a corresponding groove on a cover at the face side.

BRIEF DESCRIPTION OF THE DRAWINGS

An exemplary embodiment of the invention will be explained in more detail on the basis of a drawing. In the drawing.

In the figures, identically operating parts are provided with identical reference symbols.

DETAILED DESCRIPTION OF THE PREFERRED EMBODIMENTS

Figure 1:
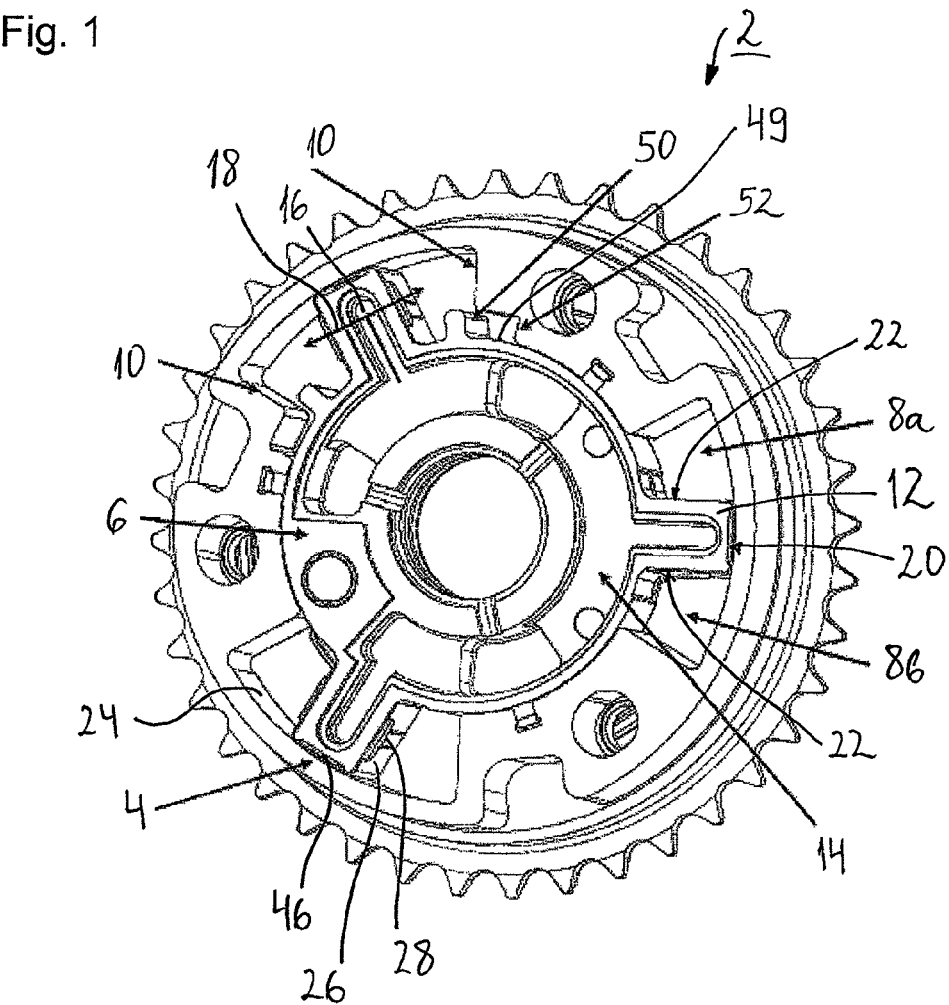
FIG. 1 shows a camshaft adjuster in a perspective illustration.
Figure 2:
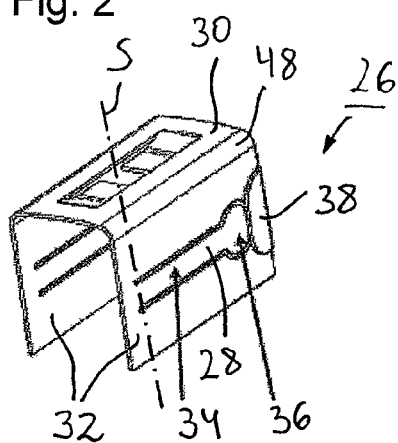
FIG. 2 shows a U-shaped sealing element for a camshaft adjuster in a perspective view from a first viewing angle.
Figure 3:
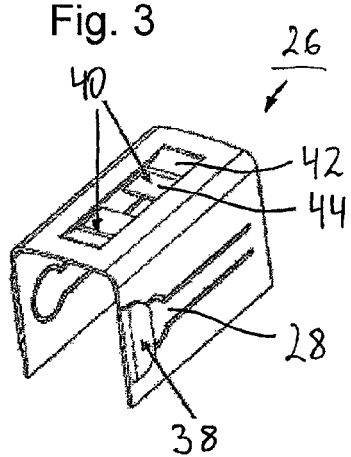
FIG. 3 shows the sealing element as per FIG. 2 in a perspective view from a second viewing angle.

FIG. 1 illustrates a camshaft adjuster 2 for variably adjusting the timing of gas valves of an internal combustion engine (not shown in any more detail). The camshaft adjuster 2 comprises a stator 4 and, arranged within the stator 4, a rotor 6 which is mounted so as to be pivotable relative to the stator 4. Between the stator 4 and the rotor 6 there are formed a plurality of chamber pairs, wherein each chamber pair comprises two oppositely acting pressure chambers or simply chambers 8a, 8b. The chamber pairs are separated from one another by webs 10 of the stator 4. A radially extending vane 12 of the rotor 6 separates the two oppositely acting chambers 8a, 8b of a chamber pair.

A pressure medium, in this case oil, is fed alternately into the chambers 8a, 8b of a chamber pair. The volume of the respective chamber 8a, 8b is enlarged by the oil in that the vane 12 is pushed away hydraulically. The volume of the oppositely acting chamber is correspondingly reduced.

To store the oil, a volume accumulator 14 is provided within the rotor 6. The oil from the volume accumulator 14 is introduced via a radial pressure medium duct 16 in the interior of the vane 12, and via a transverse portion (not shown in any more detail here) of the pressure medium duct, alternately into one of the chambers 8a, 8b. The pressure medium duct 16 opens into the respective chamber 8a, 8b via outlets (not shown in any more detail) on the vane 12. The oil flow within the rotor is indicated by the arrow 18.

The vane 12 has a radial surface 20 and two side surfaces 22 which are directed toward the respective pressure chamber 8a, 8b. To seal off the vane 12 with respect to an inner lateral surface 24 of the stator 4, a U-shaped sealing element 26 is provided which, in this exemplary embodiment, is in the form of a sheet-metal part and which is plugged radially onto the vane 12 during the assembly of the camshaft adjuster 2. Also integrated in the sealing element 26 are check valves 28 which correspond to the outlets on the side surfaces 22 of the vane 12 and which prevent an escape of the oil from the chambers 8a, 8b back into the volume accumulator 14.

The construction of a sealing element 26 of said type can be seen from FIGS. 2 to 5. The sealing element 26 comprises a base limb 30 and two side limbs 32 which, in the assembled state, bear against the radial surface 20 and against the two side surfaces 22 of the vane 12 respectively. The check valves 28 have a bending beam 34 and a circular plate 36 and, in this exemplary embodiment, are formed by punching of the material of the sealing element 26. The circular plate 36 covers the outlet for the oil on the vane 12 and has a diameter slightly larger than the diameter of the outlet. When negative pressure in relation to the volume accumulator 14 prevails in the chamber 8a, 8b, the oil pushes the circular plate 36 outward, such that the check valve 28 performs a pivoting movement about a pivot axis S along the connecting line between the bending beam 34 and the sealing element 26.

A stroke limiter 38 serves for the mechanical resetting of the circular plate 36 and thus for closing off the outlet for the oil when the pressure in the chamber 8a, 8b and in the volume accumulator 14 is the same or when a positive pressure prevails in the chamber 8a, 8b. The stroke limiter 38 is formed in the manner of a lug on the edge of the sealing element 26, which lug is bent over rearward through 180° so as to bear against the circular plate 36 and push the latter toward the outlet. Here, the stroke limiter 38 is arranged such that the circular plate 36 lies between it and the pivot axis S.

Figure 4:
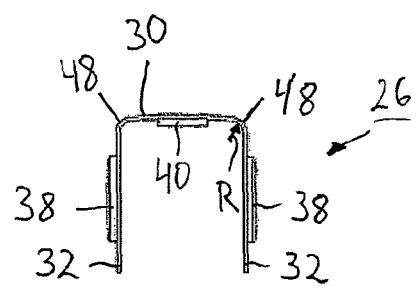
FIG. 4 shows the sealing element as per FIG. 2 in a front view.
Figure 5:
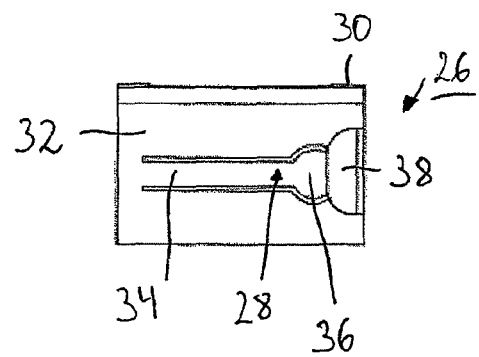
FIG. 5 shows the sealing element as per FIG. 2 in a side view.

As can be seen in particular from FIG. 4, the base limb 30 of the sealing element 26 is of slightly convex form. A radius of curvature (not shown in any more detail here) of the convex base limb 30 is for example 3 to 5 times greater than the length of the base limb 30. Also cut out in the base limb 30 is a two-part leaf spring 40, by means of which the sealing element 26 is supported on the vane 12. In the assembled state, the sealing element 26 is permanently preloaded against the lateral surface 24 of the stator 4 by means of the leaf spring 40. Each of the leaves of the two-part leaf spring 40 is pushed radially inward and has an oblique region 42 and a horizontal region 44 by means of which the sealing element 26 is supported on the vane 12. A groove 46 for receiving the leaf spring is provided on the radial surface 20 of the vane 12 as per FIG. 1.

In the exemplary embodiment shown, the edge regions 48 between the base limb 30 and the side limbs 32 are of relatively sharp-edged form in order to prevent oil from penetrating between the base limb 30 and the stator 4. A radius of curvature R of the edge regions 48 is thus several times smaller than the radial length of the side limbs 32 (see FIG. 4); in particular, the side limb 32 is over 10 times longer than the radius of curvature R.

The side surfaces 22 of the vane 12 run substantially parallel to one another. In the assembled state of the sealing element 26, the side limbs 32 which bear against the side surfaces 22 likewise extend parallel to one another. In the pre-assembly state, however, the side limbs 32 run so as to converge on one another proceeding from the base limb 30, such that the spacing between the side limbs becomes ever smaller with increasing distance from the base limb 30. When the sealing element 26 engages over the vane 12, the vane 12 is braced between the elastically flared side limbs 32, such that the oil cannot propagate between the side limbs 32 and the side surfaces 22.

Since the stroke limiter 38 can be damaged in the event of an abutment of the vane 12 against the webs 10 of the stator 4, the rotor 6 has, on its outer circumference 49, at least one lug 50 (see FIG. 1) which is provided for abutting against the stator 4. The lug 50 extends radially outward but has a much smaller height than the vane 12. A stop surface 52 is formed, correspondingly to the lug 50, in a receptacle on the web 10 of the stator 4.

The significant advantage of the arrangement described above is that sealing of the chambers 8a, 8b both with respect to the in each case oppositely acting chamber 8a, 8b and also with respect to the pressure medium ducts 16 in the vane 12 is ensured by means of the sealing element 26 with the integrated check valve 28.

LIST OF REFERENCE SYMBOLS

2 Camshaft adjuster
4 Stator
6 Rotor
8a, 8b Pressure chamber
10 Web
12 Vane
14 Volume accumulator
16 Pressure medium duct
18 Oil flow
20 Radial surface
22 Side surface
24 Lateral surface of the stator
26 Sealing element
28 Check valve
30 Base limb
32 Side limb
34 Bending beam
36 Circular plate
38 Stroke limiter
40 Leaf spring
42 Oblique region
44 Horizontal region
46 Groove
48 Edge region
49 Outer circumference
50 Lug
52 Stop surface
R Radius of curvature
S Pivot axis

The invention claimed is:

1. A vane-type camshaft adjuster comprising a stator and a rotor which is rotatable relative to the stator and at least two pressure chambers which are formed between the stator and the rotor which are separated from one another by a radially oriented vane of the rotor, wherein pressure medium can be supplied alternately to the pressure chambers, the vane has a radial surface and two side surfaces directed toward the pressure chambers, and the radial surface is sealed off by a U-shaped sealing element having a base limb and having two side limbs which bear against the side surfaces, check valves are formed on the side limbs of the sealing element, and outlets for the pressure medium are formed on the side surfaces of the vane, and the check valves are assigned to said outlets.

2. The camshaft adjuster as claimed in claim 1, wherein the sealing element is formed from a sheet-metal part and the check valves are punched out in the side limbs.

3. The camshaft adjuster as claimed in claim 2, wherein each of the check valves comprises a bending beam and a circular plate.

4. The camshaft adjuster as claimed in claim 3, wherein for resetting of the circular plate, a stroke limiter is provided formed of a bent-over lug and that presses against the circular plate.

5. The camshaft adjuster as claimed in claim 1, wherein the base limb of the sealing element is of convex form as viewed from outside.

6. The camshaft adjuster as claimed in claim 1, wherein on the base limb of the sealing element, there is provided a leaf spring for supporting the sealing element on the radial surface of the vane.

7. The camshaft adjuster as claimed in claim 6, wherein edge regions between the base limb and the side limbs have a sharp-edged form.

8. The camshaft adjuster as claimed in claim 1, wherein the vane is braced between the side limbs of the sealing element which are elastically flared.

9. The camshaft adjuster as claimed in claim 1, wherein at least one lug for abutment against the stator is formed on an outer circumference of the rotor.

\* \* \* \* \*